(12) United States Patent
Johnsrud

(10) Patent No.: US 11,439,155 B1
(45) Date of Patent: Sep. 13, 2022

(54) FISH DESCALING ASSEMBLY

(71) Applicant: Danny Johnsrud, Goodridge, MN (US)

(72) Inventor: Danny Johnsrud, Goodridge, MN (US)

( * ) Notice: Subject to any disclaimer, the term of this patent is extended or adjusted under 35 U.S.C. 154(b) by 0 days.

(21) Appl. No.: 17/224,805

(22) Filed: Apr. 7, 2021

(51) Int. Cl.
*A22C 25/00* (2006.01)
*A22C 25/02* (2006.01)
*A22C 25/08* (2006.01)

(52) U.S. Cl.
CPC .............. *A22C 25/02* (2013.01); *A22C 25/08* (2013.01)

(58) Field of Classification Search
CPC ....... A22C 25/00; A22C 25/02; A22C 25/025; A22C 25/06; A22C 25/08
USPC ................. 452/71, 81, 1–6, 114, 120, 123
See application file for complete search history.

(56) References Cited

U.S. PATENT DOCUMENTS

| | | | |
|---|---|---|---|
| 2,172,471 A | 9/1939 | Grow | |
| 2,928,118 A | 3/1960 | Hairston | |
| 2,993,227 A | 7/1961 | Couret | |
| 3,696,464 A * | 10/1972 | Dillon | A22C 21/0053 452/167 |
| 4,726,095 A | 2/1988 | Bissell, Jr. | |
| 4,815,169 A | 3/1989 | Valleau | |
| 5,514,033 A * | 5/1996 | Berry | A01K 45/005 452/183 |
| 5,863,244 A * | 1/1999 | Mansfield | A23L 5/40 452/74 |
| 5,882,253 A * | 3/1999 | Mostoller | A22C 21/0061 452/76 |
| 5,980,375 A * | 11/1999 | Anderson | A22B 5/0082 452/77 |
| 6,254,472 B1 * | 7/2001 | Meyn | A22C 21/0053 452/188 |
| 6,283,848 B1 * | 9/2001 | Berry | A22C 21/00 452/167 |
| 6,733,379 B2 * | 5/2004 | Tsang | A22C 17/08 452/173 |
| 7,077,738 B2 * | 7/2006 | Benson | B23Q 11/02 452/149 |
| 7,226,349 B2 * | 6/2007 | Berry | A22C 21/00 452/167 |
| 7,378,642 B2 * | 5/2008 | Jones | A22C 21/0053 250/221 |
| 8,066,556 B2 * | 11/2011 | Kjeldsen | A22C 21/04 452/76 |
| 8,827,775 B2 * | 9/2014 | Jefferson, Sr. | A22C 21/0053 452/173 |

* cited by examiner

*Primary Examiner* — Richard T Price, Jr.

(57) ABSTRACT

A fish descaling assembly includes a first panel that has a plurality of openings each extending through the first panel. Each of the openings has an ovoid boundary for having a fish positioned therein to restrain the fish. A first mesh screen is coupled to the first panel to support the fish when the fish are positioned in the openings. A second panel is hingedly coupled to the first panel and the second panel has a plurality of openings each extending through the second panel. Each of the openings in the second panel has an ovoid boundary to surround the fish when the second panel is closed onto the first panel. A second mesh screen is coupled to the second panel to support the fish when the fish are positioned in the openings in the second panel.

10 Claims, 6 Drawing Sheets

FISH DESCALING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to descaling device and more particularly pertains to a new descaling device for descaling fish with a power washer. The device includes a first panel that has a plurality of ovoid openings for receiving fish. The device includes a second panel that is hingedly coupled to the first panel and which is closeable on the first panel. In this way the fish are restrained for spraying with a power washer for descaling the fish.

(2) Description of Related Art Including Information Disclosed Under 37 CFR 1.97 and 1.98

The prior art relates to descaling devices including a variety of rack devices for holding fish to facilitate the fish to be descaled with pressurized water. The prior art discloses a case for holding fish to be filleted. In no instance does the prior art disclose a case that has a plurality of openings extending therethrough than each hold a fish for descaling with a pressure washer.

BRIEF SUMMARY OF THE INVENTION

An embodiment of the disclosure meets the needs presented above by generally comprising a first panel that has a plurality of openings each extending through the first panel. Each of the openings has an ovoid boundary for having a fish positioned therein to restrain the fish. A first mesh screen is coupled to the first panel to support the fish when the fish are positioned in the openings. A second panel is hingedly coupled to the first panel and the second panel has a plurality of openings each extending through the second panel. Each of the openings in the second panel has an ovoid boundary to surround the fish when the second panel is closed onto the first panel. A second mesh screen is coupled to the second panel to support the fish when the fish are positioned in the openings.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
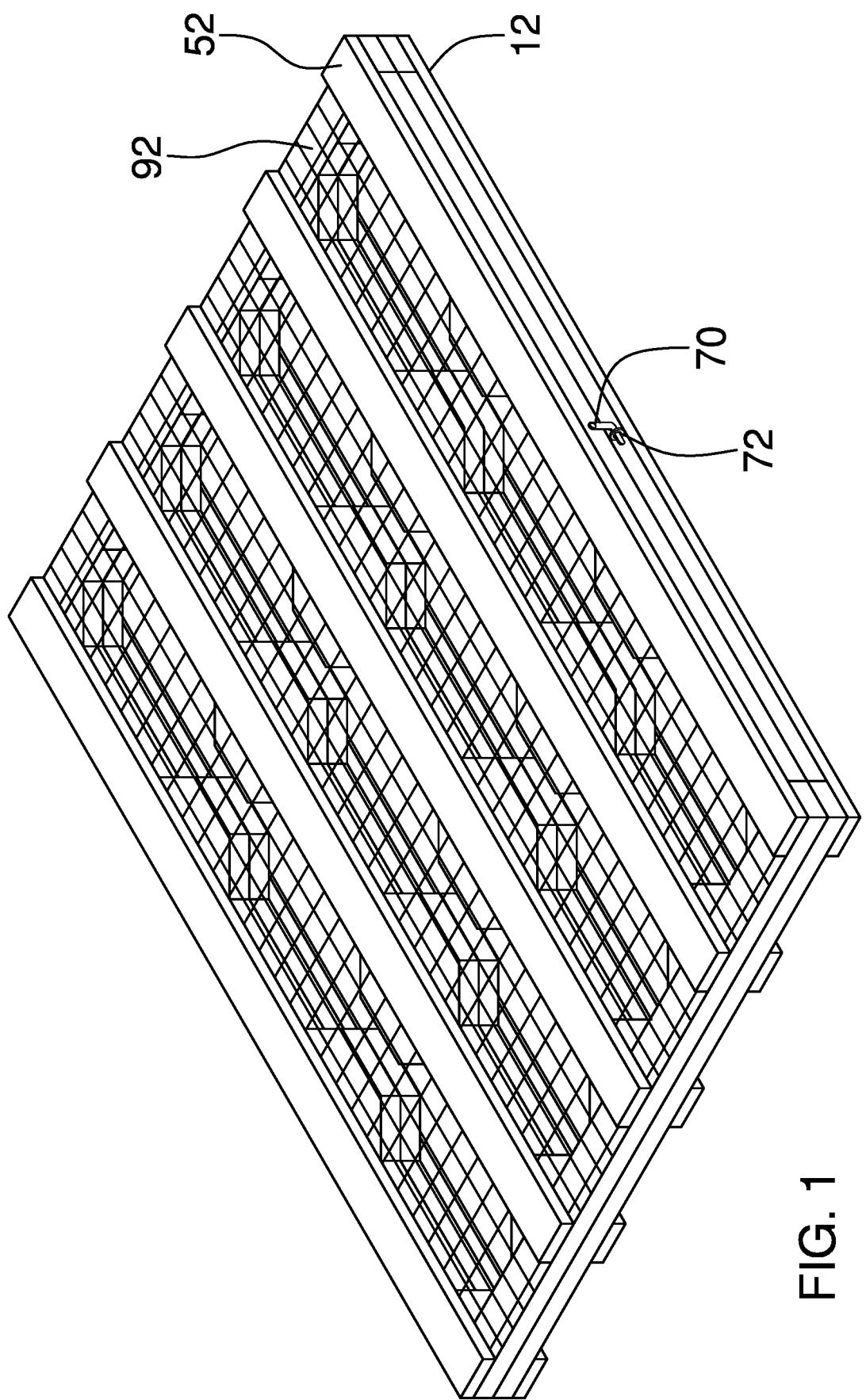
FIG. 1 is a top perspective view of a fish descaling assembly according to an embodiment of the disclosure.
Figure 2:
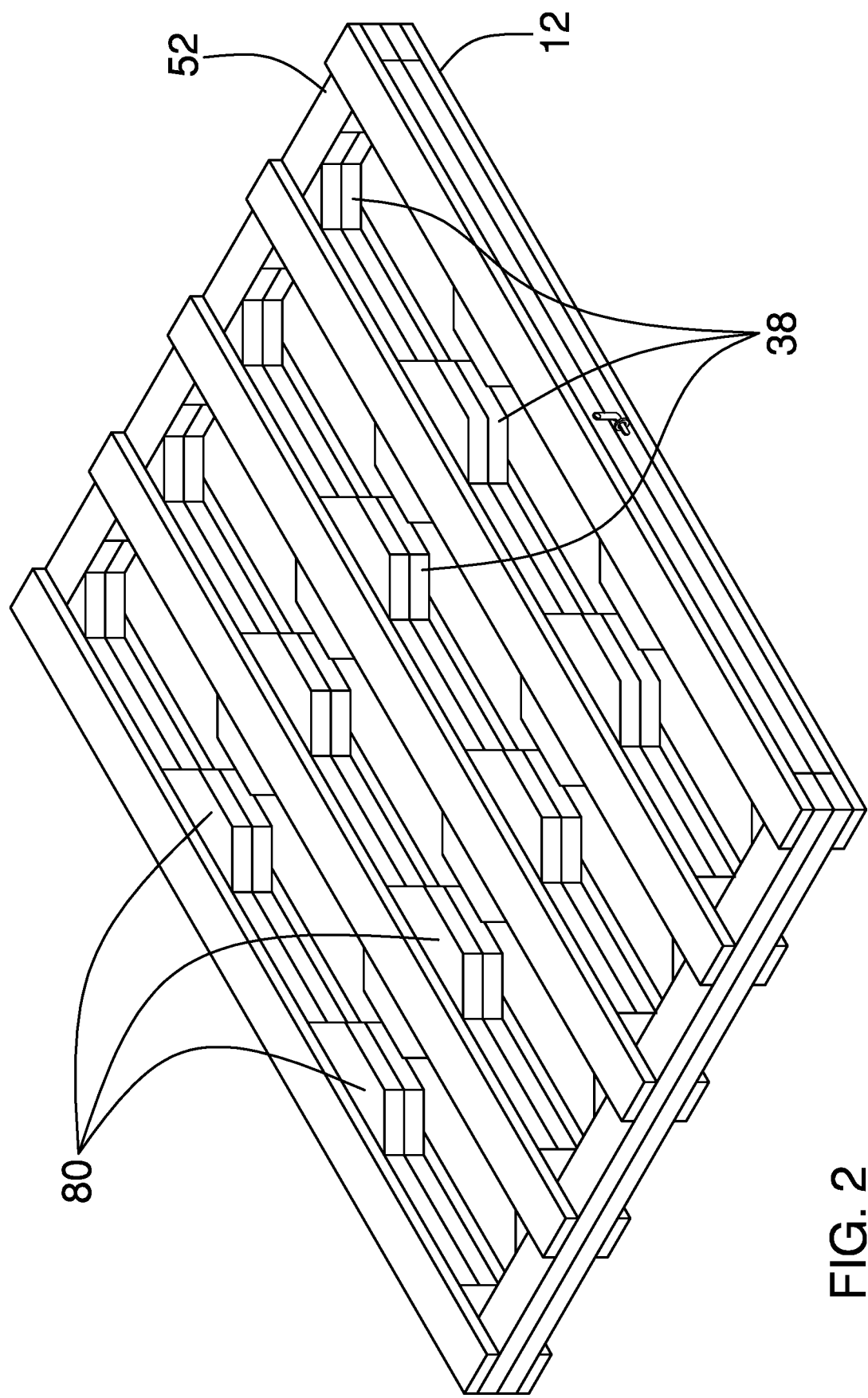
FIG. 2 is a top perspective view of an embodiment of the disclosure showing a first panel without a first mesh screen.
Figure 3:
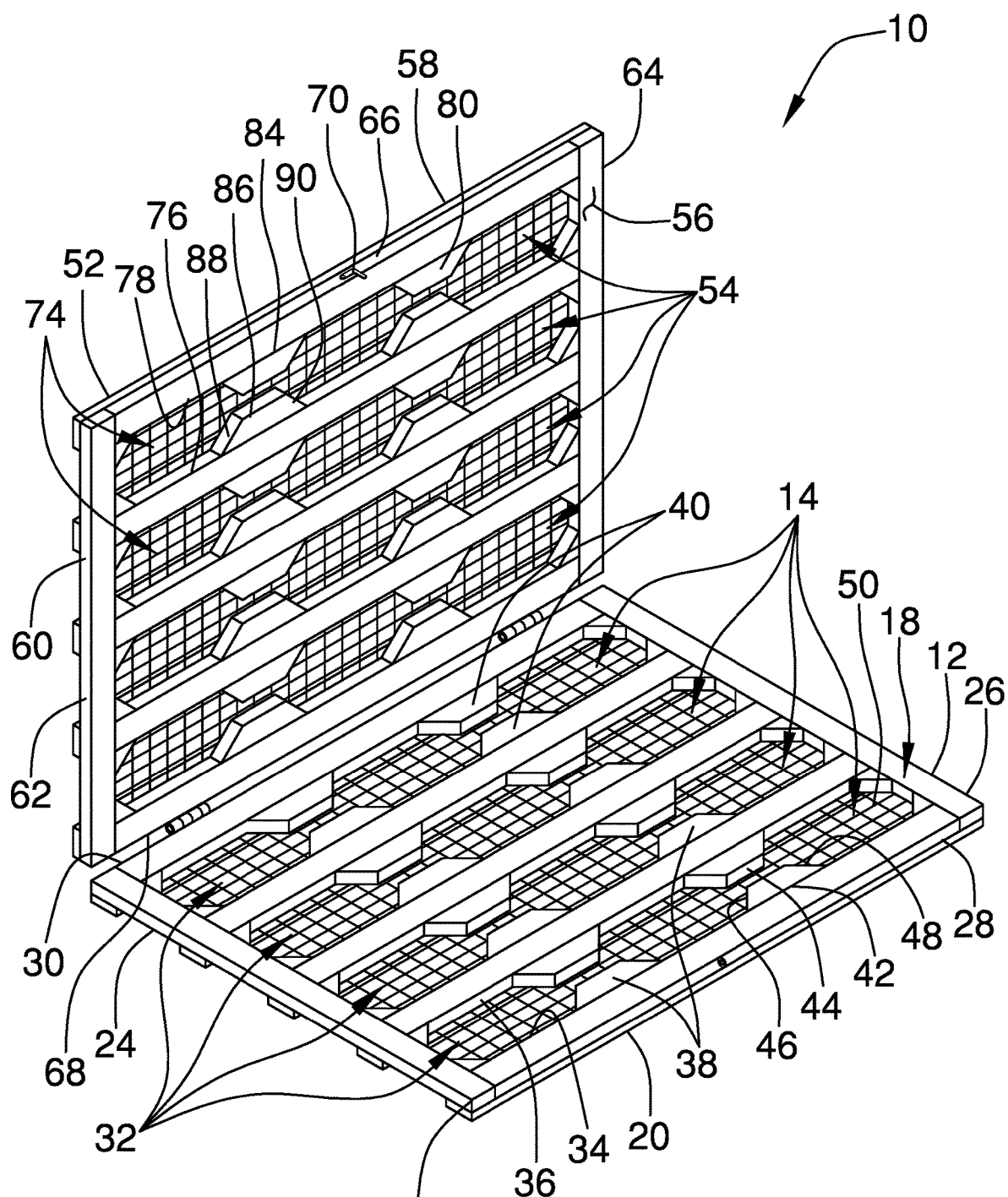
FIG. 3 is a top perspective view of an embodiment of the disclosure showing a second panel being positioned in an open position with respect to a second panel.
Figure 4:
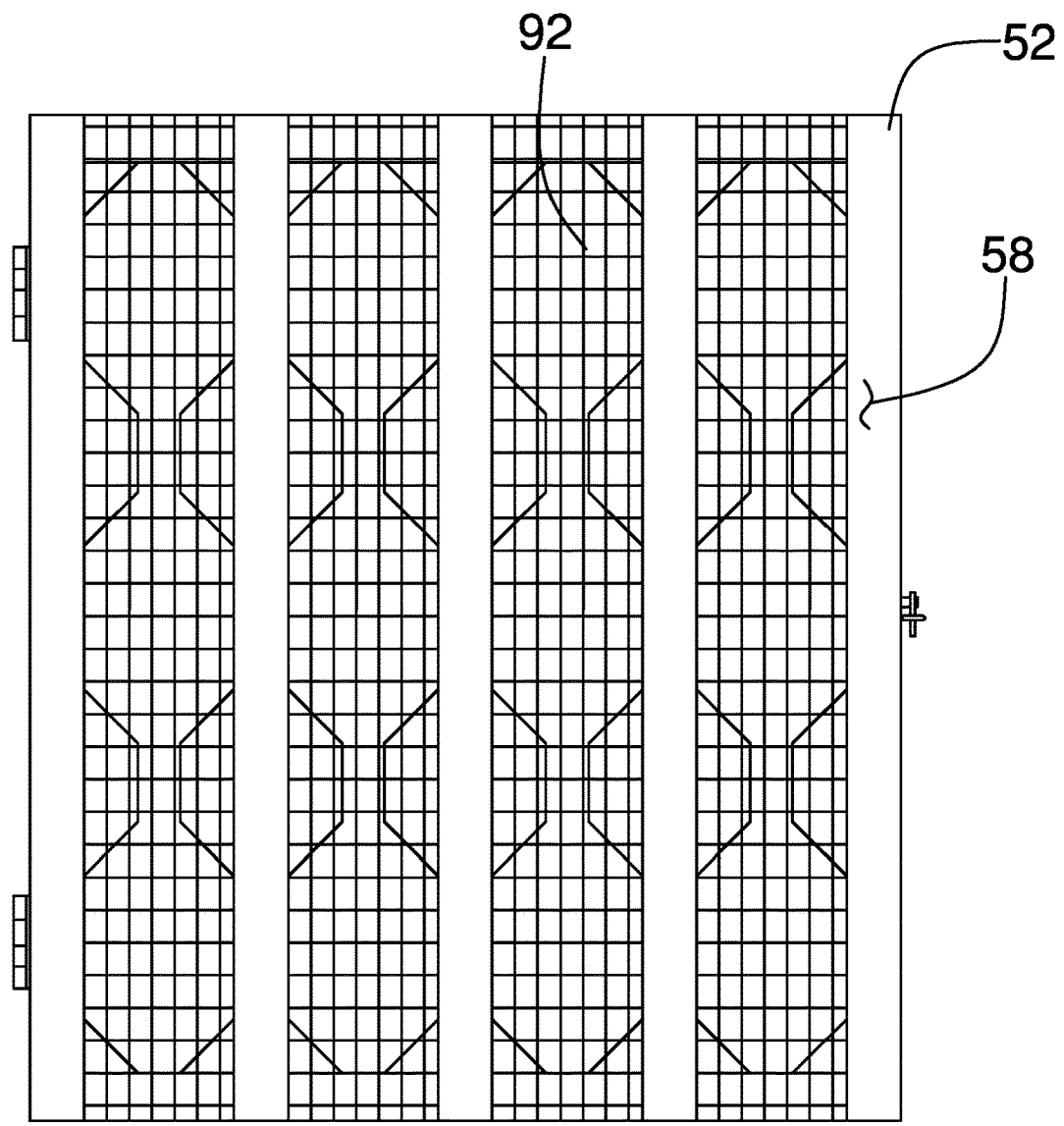
FIG. 4 is a bottom view of an embodiment of the disclosure.
Figure 5:
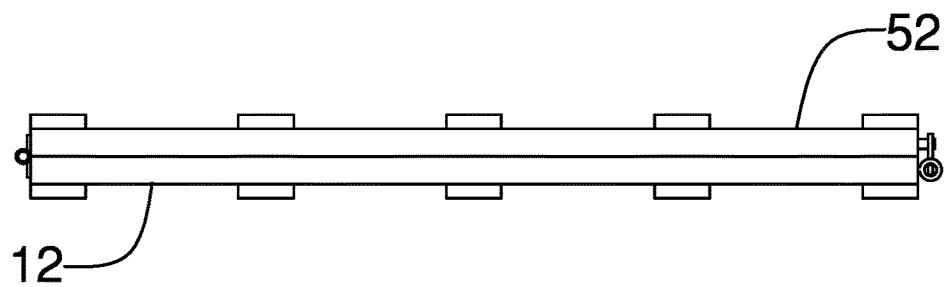
FIG. 5 is a right side view of an embodiment of the disclosure.
Figure 6:
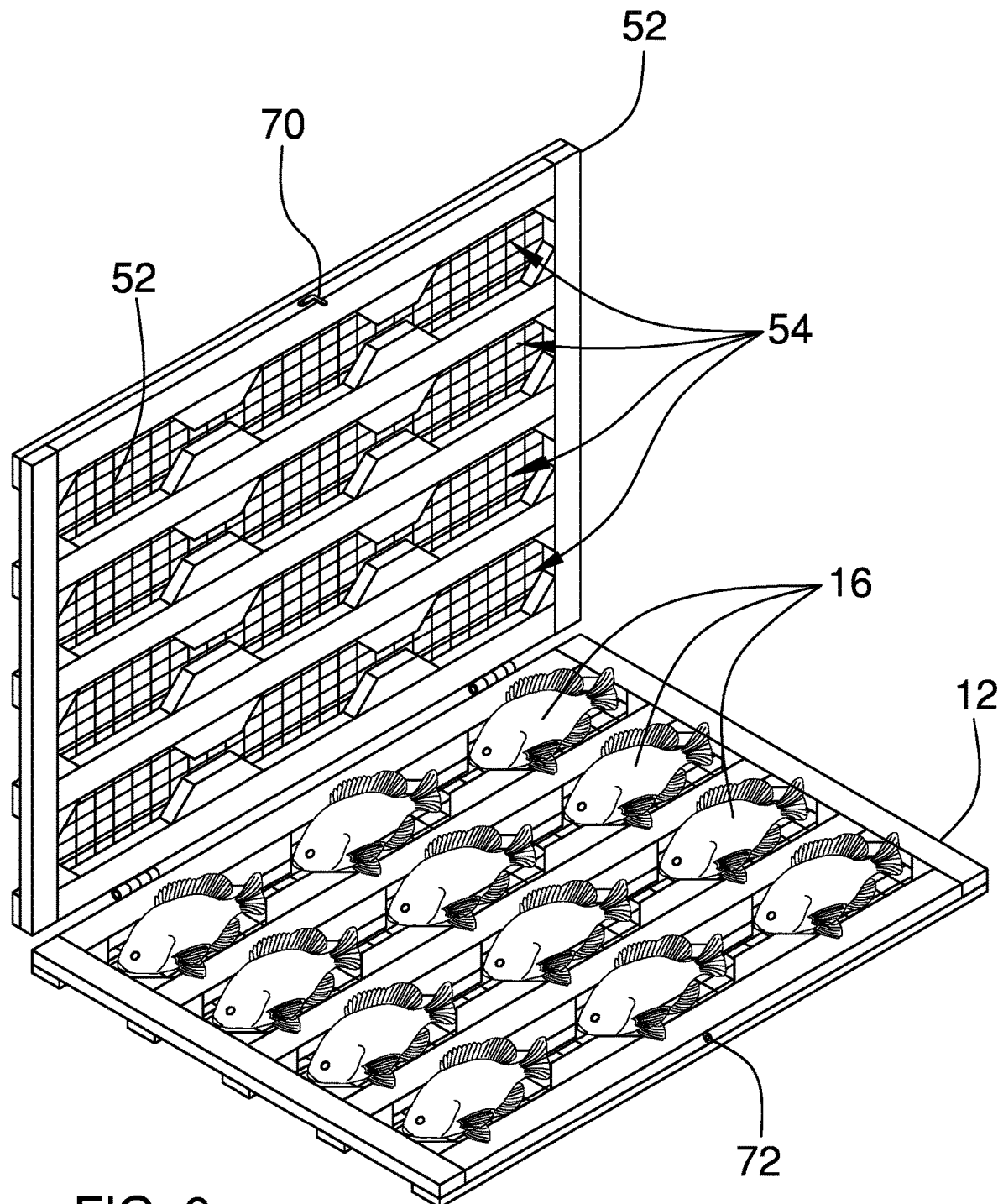
FIG. 6 is a perspective view of an embodiment of the disclosure showing fish being placed into openings in a first panel.
Figure 7:
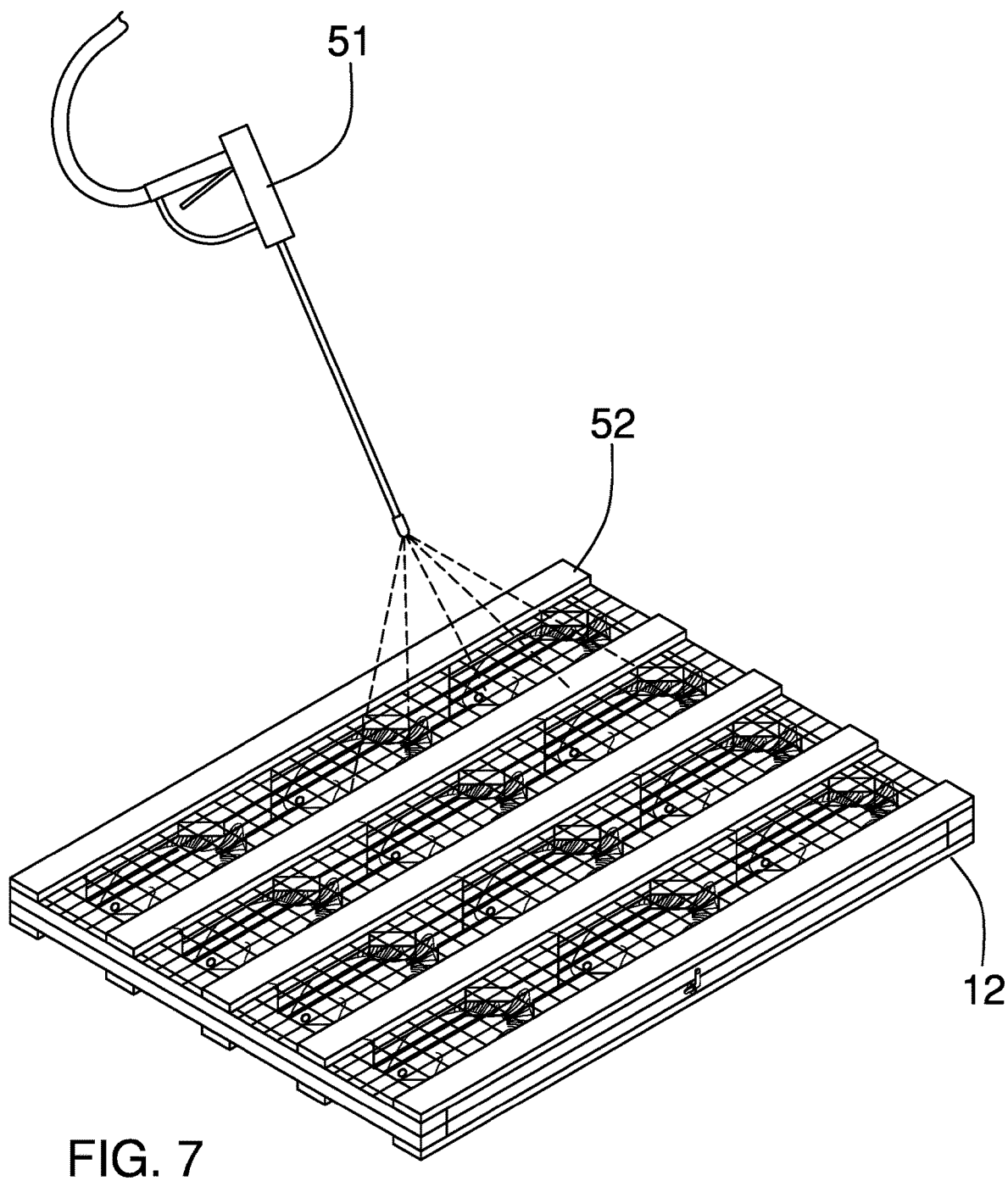
FIG. 7 is a perspective in-use view of an embodiment of the disclosure.

With reference now to the drawings, and in particular to FIGS. 1 through 7 thereof, a new descaling device embodying the principles and concepts of an embodiment of the disclosure and generally designated by the reference numeral 10 will be described.

As best illustrated in FIGS. 1 through 7, the fish descaling assembly 10 generally comprises a first panel 12 that has a plurality of openings 14 each extending through the first panel 12. Each of the openings 14 has an ovoid boundary such that each of the openings approximates the shape of a fish. In this way a fish 16 can be positioned in each of the openings 14 for restraining the fish 16. The fish 16 may be a freshwater panfish, such as Bluegill or Crappie for example, or other type of fish that is commonly descaled prior to being filleted. Additionally the first panel 12 may have a length of approximately 30.0 inches and a width of approximately 20.0 inches.

The first panel 12 has a first surface 18, a second surface 20 and a perimeter edge 22 extending between the first surface 18 and the second surface 20, and the perimeter edge 22 has a first lateral side 24, a second lateral side 26, a front side 28 and a back side 30. The first panel 12 has a plurality of first slots 32 each extending through the first surface 18 and the second surface 20. Each of the first slots 32 extends substantially between the first lateral side 24 and the second lateral side 26. The first slots 32 are spaced apart from each other and are distributed between the top side and the bottom side, and each of the first slots 32 has a first bounding edge 34 and a second bounding edge 36.

A plurality of first blocks 38 is each positioned in a respective one of the first slots 32. The plurality of first blocks 38 is arranged into a set of pairs of the first blocks 40, and the pairs of first blocks 40 are distributed along the respective first slot 32. Thus, each of the openings 14 in the first panel 12 is defined between respective pairs of the first blocks 40. Each of the first blocks 38 has a bottom edge 42, a top edge 44, a front edge 46 and a back edge 48, and each of the front edge 46 and the back edge 48 slopes inwardly between the bottom edge 42 and the top edge 44 such that each of the first blocks 38 has a trapezoidal shape. The bottom edge 42 of each of the first blocks 38 is coupled to a respective one of the first bounding edge 34 or the second bounding edge 36 of the respective first slot 32. Moreover, the top edge 44 of each of the pairs of first blocks 38 is aligned with each other and is directed toward each other. Each of the front edge 46 and the back edge 48 of opposing pairs of the first blocks 38 slopes away from each other.

A first mesh screen 50 is provided and the first mesh screen 50 is coupled to the first panel 12. The first mesh screen 50 supports the fish 16 when the fish 16 are positioned in the openings. The first mesh screen 50 is positioned on the second surface 20 of the first panel 12 and the first mesh screen 50 completely covers the second surface 20. The first mesh screen 50 facilitates a power washer 51, for example, to spray against the fish 16 for removing scales from the fish 16 while the fish 16 are in the first panel 12.

A second panel 52 is hingedly coupled to the first panel 12 and the second panel 52 has a plurality of openings 54 each extending through the second panel 52. Each of the openings 54 in the second panel 52 has an ovoid boundary such that each of the openings 54 in the second panel 52 approximates the shape of a fish. The second panel 52 is positionable in a closed position against the first panel 12 to surround the fish 16 for restraining the fish 16. The second panel 52 has a primary surface 56, a secondary surface 58 and an exterior edge 60 extending between the primary surface 56 and the secondary surface 58, and the exterior edge 60 has a first lateral side 62, a second lateral side 64, a front side 66 and a back side 68. A latch 70 is movably attached to the front side 66 of the exterior edge 60 of the second panel 52. The latch 70 releasably engages a catch 72 on the front side 28 of the perimeter edge 22 of the first panel 12 when the second panel 52 is positioned in the closed position. In this way the latch 70 retains the second panel 52 in the closed position.

The second panel 52 has a plurality of second slots 74 each extending through the primary surface 56 and the secondary surface 58. Each of the second slots 74 extends substantially between the second lateral side 62 and the second lateral side 64 of the exterior edge 60. The second slots 74 are spaced apart from each other and are distributed between the front side 66 and the back side 68 of the exterior edge 60. Each of the second slots 74 has a first bounding edge 76 and a second bounding edge 78, and the secondary surface 58 of the second panel 52 rests on the first surface 18 of the first panel 12 when the second panel 52 is in the closed position. Additionally, the second panel 52 may have dimensions that are equal to the dimensions of the first panel 12.

A plurality of second blocks 80 is each of the second blocks 80 is positioned in a respective one of the second slots 74. The plurality of second blocks 80 is arranged into a set of pairs of the second blocks 82 and the pairs of second blocks 82 are distributed along the respective second slot 74 such that each of the openings in the second panel 52 is defined between respective pairs of the second blocks 80. Each of the second blocks 80 has a bottom edge 84, a top edge 86, a front edge 88 and a back edge 90, and each of the front edge 88 and the back edge 90 of the second blocks 80 slopes inwardly between the bottom edge 84 and the top edge 86 of the second blocks 80 such that each of the second blocks 80 has a trapezoidal shape.

The bottom edge 84 of each of the second blocks 80 is coupled to a respective one of the first bounding edge 76 or the second bounding edge 78 of the respective second slot 74. The top edge 86 of each of the pairs of second blocks 80 is aligned with each other and is directed toward each other. Additionally, each of the front edge 88 and the back edge 90 of opposing pairs of the second blocks 80 slopes away from each other. A second mesh screen 92 is coupled to the second panel 52 to support the fish 16 when the fish 16 are positioned in the openings. The second mesh screen 92 is positioned on the primary surface 56 of the second panel 52 and the second mesh screen 92 completely covers the primary surface 56. The second mesh screen 92 facilitates a power washer 51, for example, to spray against the fish 16 for removing scales from the fish 16 while the fish 16 are enclosed between the first panel 12 and the second panel 52.

In use, each of the fish 16 is placed into a respective opening 14 in the first panel 12 and the second panel 52 is positioned in the closed position. The first panel 12 and the second panel 52 are laid flat on the ground such that the first mesh screen 50 is exposed. The power washer 51, or other similar device, is sprayed against the fish 16 for descaling the fish 16. The first panel 12 and the second panel 52 are flipped over such that the second mesh screen 92 is exposed. In this way the power washer 51 can be sprayed against the opposite side of the fish 16 for descaling. The second panel 52 is positioned in an open position to facilitate the fish 16 to be removed for filleting. In this way a large number of fish 16 can quickly and efficiently be descaled while being retained in a chosen position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fish descaling assembly for holding a plurality of fish in a fixed position to facilitate descaling the plurality of fish, said assembly comprising:

a first panel having a plurality of openings each extending through said first panel, each of said openings having an ovoid boundary such that each of said openings approximates the shape of a fish wherein each of said openings is configured to have a fish positioned therein for restraining the fish;
a first mesh screen being coupled to said first panel wherein said first mesh screen is configured to support the fish when the fish are positioned in said openings;
a second panel being hingedly coupled to said first panel, said second panel having a plurality of openings each extending through said second panel, each of said openings in said second panel having an ovoid boundary such that each of said openings in said second panel approximates the shape of a fish, said second panel being positionable in a closed position against said first panel wherein each of said openings in said second panel is configured to surround the fish for restraining the fish; and
a second mesh screen being coupled to said second panel wherein said second mesh screen is configured to support the fish when the fish are positioned in said openings.

2. The assembly according to claim 1, wherein said first panel has a first surface, a second surface and a perimeter edge extending between said first surface and said second surface, said perimeter edge having a first lateral side, a second lateral side, a front side and a back side, said first panel having a plurality of first slots each extending through said first surface and said second surface, each of said first slots extending substantially between said first lateral side and said second lateral side, said first slots being spaced apart from each other and being distributed between said top side and said bottom side, each of said first slots having a first bounding edge and a second bounding edge.

3. The assembly according to claim 2, further comprising a plurality of first blocks, each of said first blocks being positioned in a respective one of said first slots, said plurality of first blocks being arranged into a set of pairs of said first blocks, said pairs of first blocks being distributed along said respective first slot such that each of said openings in said first panel is defined between respective pairs of said first blocks.

4. The assembly according to claim 3, wherein each of said first blocks has a bottom edge, a top edge, a front edge and a back edge, each of said front edge and said back edge sloping inwardly between said bottom edge and said top edge such that each of said first blocks has a trapezoidal shape, said bottom edge of each of said first blocks being coupled to a respective one of said first bounding edge or said second bounding edge of said respective first slot.

5. The assembly according to claim 4, wherein said top edge of each of said pairs of first blocks is aligned with each other and being directed toward each other, each of said front edge and said back edge of opposing pairs of said first blocks sloping away from each other.

6. The assembly according to claim 1, wherein said second panel has a primary surface, a secondary surface and an exterior edge extending between said primary surface and said secondary surface, said exterior edge having a first lateral side, a second lateral side, a front side and a back side, said second panel having a plurality of second slots each extending through said primary surface and said secondary surface, each of said second slots extending substantially between said second lateral side and said second lateral side of said exterior edge, said second slots being spaced apart from each other and being distributed between said front side and said back side of said exterior edge, each of said second slots having a first bounding edge and a second bounding edge, said second surface of said second panel resting on a first surface of said first panel when said second panel is in said closed position.

7. The assembly according to claim 6, further comprising:
a plurality of first blocks, each of said first blocks being disposed on said first panel; and
a plurality of second blocks, each of said second blocks being positioned in a respective one of said second slots, said plurality of second blocks being arranged into a set of pairs of said second blocks, said pairs of second blocks being distributed along said respective second slot such that each of said openings in said second panel is defined between respective pairs of said second blocks.

8. The assembly according to claim 7, wherein each of said second blocks has a bottom edge, a top edge, a front edge and a back edge, each of said front edge and said back edge of said second blocks sloping inwardly between said bottom edge and said top edge of said second blocks such that each of said second blocks has a trapezoidal shape, said bottom edge of each of said second blocks being coupled to a respective one of said first bounding edge or said second bounding edge of said respective second slot.

9. The assembly according to claim 8, wherein said top edge of each of said pairs of second blocks is aligned with each other and being directed toward each other, each of said first lateral edge and said second lateral edge of opposing pairs of said second blocks sloping away from each other.

10. A fish descaling assembly for holding a plurality of fish in a fixed position to facilitate descaling the plurality of fish, said assembly comprising:
a first panel having a plurality of openings each extending through said first panel, each of said openings having an ovoid boundary such that each of said openings approximates the shape of a fish wherein each of said openings is configured to have a fish positioned therein for restraining the fish, said first panel having a first surface, a second surface and a perimeter edge extending between said first surface and said second surface, said perimeter edge having a first lateral side, a second lateral side, a front side and a back side, said first panel having a plurality of first slots each extending through said first surface and said second surface, each of said first slots extending substantially between said first lateral side and said second lateral side, said first slots being spaced apart from each other and being distributed between said top side and said bottom side, each of said first slots having a first bounding edge and a second bounding edge;
a plurality of first blocks, each of said first blocks being positioned in a respective one of said first slots, said plurality of first blocks being arranged into a set of pairs of said first blocks, said pairs of first blocks being distributed along said respective first slot such that each of said openings in said first panel is defined between respective pairs of said first blocks, each of said first blocks having a bottom edge, a top edge, a front edge and a back edge, each of said front edge and said back edge sloping inwardly between said bottom edge and said top edge such that each of said first blocks has a trapezoidal shape, said bottom edge of each of said first blocks being coupled to a respective one of said first bounding edge or said second bounding edge of said respective first slot, said top edge of each of said pairs of first blocks being aligned with each other and being directed toward each other, each of said front edge and said back edge of opposing pairs of said first blocks sloping away from each other;

a first mesh screen being coupled to said first panel wherein said first mesh screen is configured to support the fish when the fish are positioned in said openings, said first mesh screen being positioned on said second surface of said first panel, said first mesh screen completely covering said second surface;

a second panel being hingedly coupled to said first panel, said second panel having a plurality of openings each extending through said second panel, each of said openings in said second panel having an ovoid boundary such that each of said openings in said second panel approximates the shape of a fish, said second panel being positionable in a closed position against said first panel wherein each of said openings in said second panel is configured to surround the fish for restraining the fish, said second panel having a primary surface, a secondary surface and an exterior edge extending between said primary surface and said secondary surface, said exterior edge having a first lateral side, a second lateral side, a front side and a back side, said second panel having a plurality of second slots each extending through said primary surface and said secondary surface, each of said second slots extending substantially between said first lateral side and said second lateral side of said exterior edge, said second slots being spaced apart from each other and being distributed between said front side and said back side of said exterior edge, each of said second slots having a first bounding edge and a second bounding edge, said second surface of said second panel resting on said first surface of said first panel when said second panel is in said closed position;

a plurality of second blocks, each of said second blocks being positioned in a respective one of said second slots, said plurality of second blocks being arranged into a set of pairs of said second blocks, said pairs of second blocks being distributed along said respective second slot such that each of said openings in said second panel is defined between respective pairs of said second blocks, each of said second blocks having a bottom edge, a top edge, a front edge and a back edge, each of said front edge and said back edge of said second blocks sloping inwardly between said bottom edge and said top edge of said second blocks such that each of said second blocks has a trapezoidal shape, said bottom edge of each of said second blocks being coupled to a respective one of said first bounding edge or said second bounding edge of said respective second slot, said top edge of each of said pairs of second blocks being aligned with each other and being directed toward each other, each of said front edge and said back edge of opposing pairs of said second blocks sloping away from each other;

a second mesh screen being coupled to said second panel wherein said second mesh screen is configured to support the fish when the fish are positioned in said openings, said second mesh screen being positioned on said primary surface of said second panel, said second mesh screen completely covering said primary surface.

* * * * *